United States Patent [19]

Stäheli

[11] Patent Number: 4,916,571

[45] Date of Patent: Apr. 10, 1990

[54] SPRAY-COATING DEVICE

[75] Inventor: Hans Stäheli, Gossau, Switzerland

[73] Assignee: Ransburg-Gema AG, Switzerland

[21] Appl. No.: 221,893

[22] Filed: Jul. 20, 1988

[30] Foreign Application Priority Data

Jul. 20, 1987 [DE] Fed. Rep. of Germany ....... 3723944

[51] Int. Cl.$^4$ ............................................. H01T 19/00
[52] U.S. Cl. ...................................... 361/227; 361/235
[58] Field of Search ................. 361/222, 225, 227, 235

[56] References Cited

U.S. PATENT DOCUMENTS

| 4,306,271 | 12/1981 | Weber | 361/235 |
| 4,745,520 | 5/1988 | Hughey | 361/235 |
| 4,747,012 | 5/1988 | Maeba et al. | 361/235 |

Primary Examiner—Philip H. Leung
Assistant Examiner—Jeffrey A. Gaffin
Attorney, Agent, or Firm—Ostrolenk, Faber, Gerb & Soffen

[57] ABSTRACT

A spray-coating device for spraying liquid or powdered coating material on articles includes a transformer for stepping up an alternating voltage and a voltage multiplier circuit for converting the output of the transformer to a high DC output for driving a charging electrode in the spray-coating device. The alternating voltage for the transformer is obtained from a controllable source of alternating voltage which produces a sinusoidal voltage whose frequency is constantly adjusted such that the voltage and current flowing through the transformer are in phase with one another. This assures that the transformer is operated at its resonant frequency.

13 Claims, 2 Drawing Sheets

SPRAY-COATING DEVICE

BACKGROUND OF THE INVENTION

The present invention relates to a spray-coating device, and more particularly to a controlled oscillator for driving the transformer of a spray-coating device wherein the oscillator frequency is constantly and automatically adjusted to oscillate at the resonant frequency of the transformer.

A spray-coating device is described in U.S. Pat. No. 3,895,262. In the patent, an oscillator produces an alternating voltage for driving a step-up transformer. The output of the transformer is converted by a voltage multiplier circuit to a very high DC voltage for a charging electrode that is deployed for charging powdered or liquid coating material. The voltage multiplier circuit can be a cascade circuit formed by rectifiers and capacitors or by an arrangement of resistors.

Optimally, in order to reduce heating of the transformer, the oscillator should be operated at a particular frequency, namely the resonant frequency of the transformer. That resonant frequency is determined by the inductance of the transformer and its capacitance. The latter arises from and is determined by the number of turns on the secondary winding of the transformer. When the transformer is operated outside its resonant frequency, the transformer current—and hence the loss in the transformer due to transformer heating—increases sharply.

Ordinary oscillators have inherent disadvantages. For example, their outputs are not precisely sinusoidal. Moreover, conventional oscillator outputs contain undesired harmonics and the electrical power at the outputs tends to vary in response to different factors as, for example, the type of signal being produced. This results in higher reactive powers in a transformer driven by a conventional oscillator and consequently to relatively strong heating of the transformer. The problem of overheating is particularly acute in spray-coating devices which incorporate the transformer within the spraying device, as for example in a hand held spraying gun.

Conventional oscillators have other disadvantages as well. For example, they typically oscillate only while actually connected to a transformer because they depend on the inductance and capacitance (LC) of the transformer and of the spraying gun to oscillate. The oscillator frequency is, therefore, affected in part by the transformer. This makes for more difficult control of the output frequency of conventional oscillators.

Devices, other than oscillators, are known in other arts for producing alternating voltages. For example, Federal Republic of Germany OS 34 31 001 A1 describes a device with an induction coil for heating a material by operating the induction coil at its resonant frequency. However, because the type and the size of the material being heated and its proximity to the induction coil affect the inductance of the coil, a phase shift correcting circuit is necessary for regulating the phase shift to reduce reactive power.

Federal Republic of Germany OS 36 01 191 A1 similarly discloses a phase-regulating device for a parallel resonant circuit converter. Also, general-purpose digital sine-wave generators are described in Federal Republic of Germany OS 20 45 971 and in the journal "Elektronik" 5/Mar. 11, 1983, pages 53 to 57.

SUMMARY OF THE INVENTION

It is an object of the present invention to provide a spray-coating device which can be operated at higher power levels.

It is another object of the invention to provide a spray-coating device with reduced heating of components within the device.

It is yet another object of the present invention to provide a spray-coating device that is optimized to reduce heating of the transformer of the spray-coating device.

It is still a further object of the invention to provide a spray-coating device with a controlled oscillator for driving a transformer in a manner that avoids the disadvantages associated with conventional oscillators.

The foregoing and other objects of the invention are realized in a spray-coating device which includes a controllable source of alternating voltage, a transformer the primary winding of which is driven by the alternating voltage and a voltage multiplier circuit connected to the secondary winding of the transformer. The voltage multiplier circuit converts the alternating voltage at the secondary winding of the transformer to a high DC voltage for powering one or more electrodes in the spray-coating device to electrostatically charge—by means of the electrodes—powdered or liquid coating material being sprayed on articles.

According to the present invention, heating of the transformer is reduced significantly by carefully maintaining the voltage and current waveforms in the primary of the transformer in phase with one another. As is known, when the voltage and current of a transformer are in phase, the transformer operates at its resonant, and therefore most effective, frequency.

To this end, the controllable source of alternating voltage of the present invention includes a controllable sine-wave generator having an output for outputting a controlled sine-wave and two inputs including an analog signal input whose amplitude determines the amplitude of the controlled sine-wave output and a second input by which the frequency of the sine-wave is controlled.

The second input to the sine-wave generator is supplied by a closed-loop feedback circuit which monitors the voltage and current waveforms at the transformer and outputs a signal which is applied as the second input to the controlled sine-wave generator. That signal effectively controls the output of the sine-wave generator in a precise manner that assures that the voltage and current waveforms at the transformer are in phase with one another.

As a result, heating of the transformer of the present invention is reduced by about 20% which, if so desired, allows the spraying device of the present invention to be operated at correspondingly higher power levels. Many of the known disadvantages that are inherent in conventional oscillators are avoided and a clean, crisp, sinusoidal voltage is obtained for driving the transformer. Unlike prior art oscillators, the controlled sine-wave generator of the invention can oscillate even without a transformer connected thereto. The invention eliminates build up problems (oscillation starting problems) which are associated with conventional oscillators.

Unlike prior art feedback oscillators, the feedback circuit of the invention does not require a separate feedback winding in the transformer to form a resonant circuit and the feedback scheme of the present invention does not distort or lead to losses in the wave shape of the signal generated by the controlled oscillator of the invention.

Other features and advantages of the present invention will become apparent from the following description of the invention which refers to the accompanying drawings.

DETAILED DESCRIPTION OF THE DRAWINGS

Figure 1:
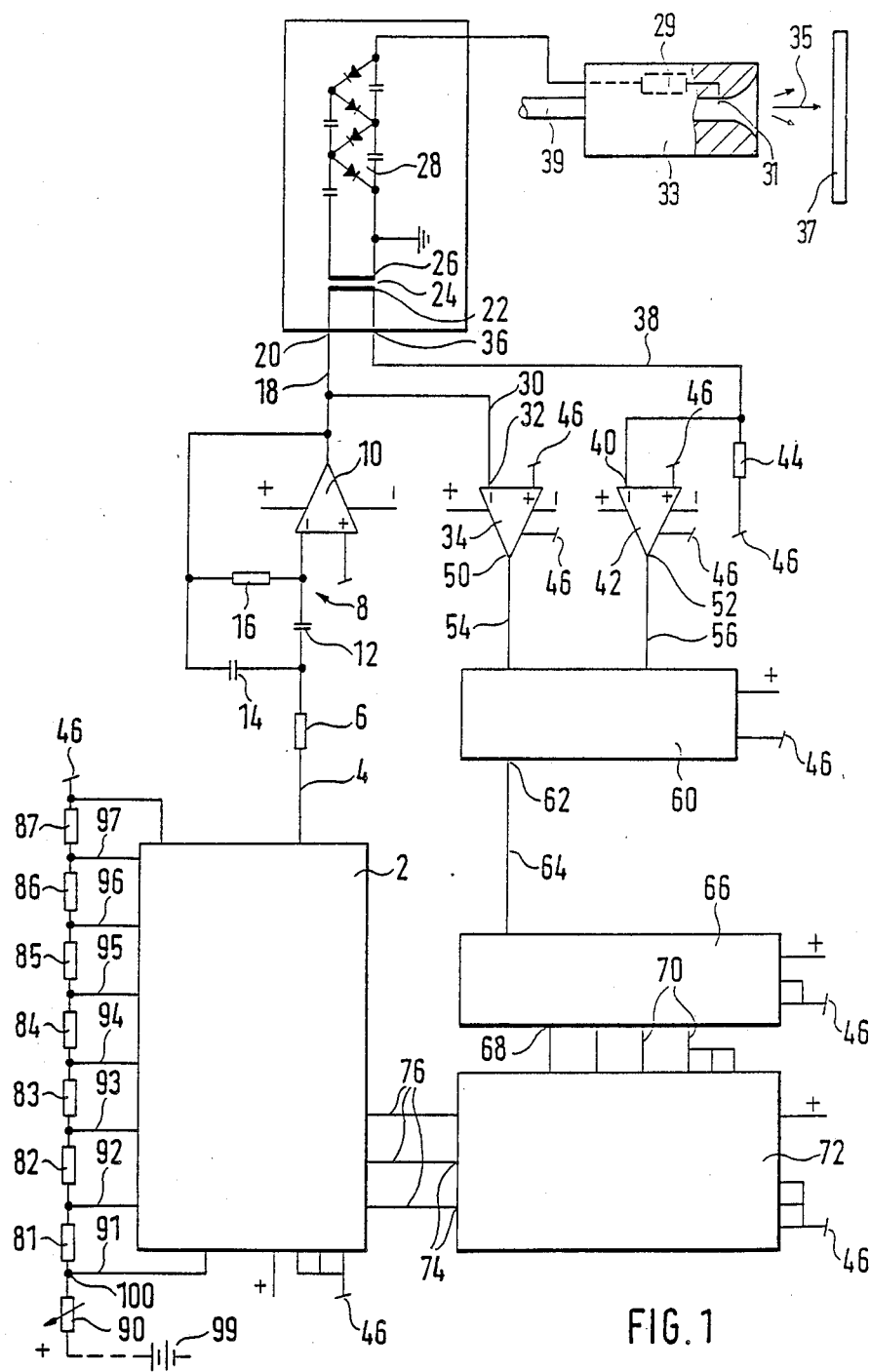
FIG. 1 is a schematic of a spray-coating device in accordance with the present invention.

Referring to FIG. 1, a spray-coating device according to the present invention includes an analog switch arrangement 2, for example an analog multiplexer, which outputs a staircase-shaped sine-wave at its output line 4 (see FIG. 2) in response to first and second inputs. The first input is received at lines 91-97 and 100 from a source of voltage 99 through a potentiometer 90 and a voltage divider network 81-87. The second input is received at lines 76.

The amplitude of the sine-wave at output line 4 can be controlled by varying the setting of potentiometer 90 or, in accordance with another embodiment, by dispensing with the potentiometer 90 and controlling the voltage magnitude delivered by means of voltage source 99. The second input at lines 76 controls the frequency of the sine-wave at output line 4. The voltage divider network is formed of a plurality of series-connected resistors 81-87 and electrical lines 91-97 and is effective for supplying to the analog switch arrangement 2 a plurality of inputs at different voltage levels. These different voltage levels are sequentially selected in response to the inputs at lines 76 to thereby synthesize the staircase-shaped voltage at output line 4. The analog switch arrangement 2 can be an integrated circuit (IC).

The staircase-shaped output at line 4 of switch arrangement 2 is supplied to a bandpass filter 8 which includes capacitors 12 and 14, resistors 6 and 16 and a power operational amplifier 10 for removing any DC voltage component from and/or for amplifying the staircase-shaped voltage on output line 4. At its output 18, the bandpass filter 8 delivers a pure and smooth sinusoidal voltage that contains no DC voltage offset. A bandpass filter is provided for smoothing the staircase-shaped signal at output line 4, rather than a low-pass filter, because a low-pass filter would merely smooth out the depths—that is the edges—of the step voltages on output line 4 of switching arrangement 2.

The sinusoidal output from power operational amplifier 10 is connected to terminal 20 of primary winding 22 of a transformer 24, via an output line 18. The secondary winding 26 of the transformer 24 drives a voltage multiplier circuit 28 which circuit 28 converts the alternating voltage at the secondary winding 26 of transformer 24 to a very high DC voltage output 27 which is suitable for driving one or more electrodes 31 of a spray unit 33, through a protective resistor 29. The high DC voltage at electrode 31 serves to electrostatically charge a coating material 35 for a more effective spraying of the coating material 35 on articles 37. Coating material 35 is supplied to spray unit 33 via a fluid line 39, in liquid or powdered form.

Figure 2:
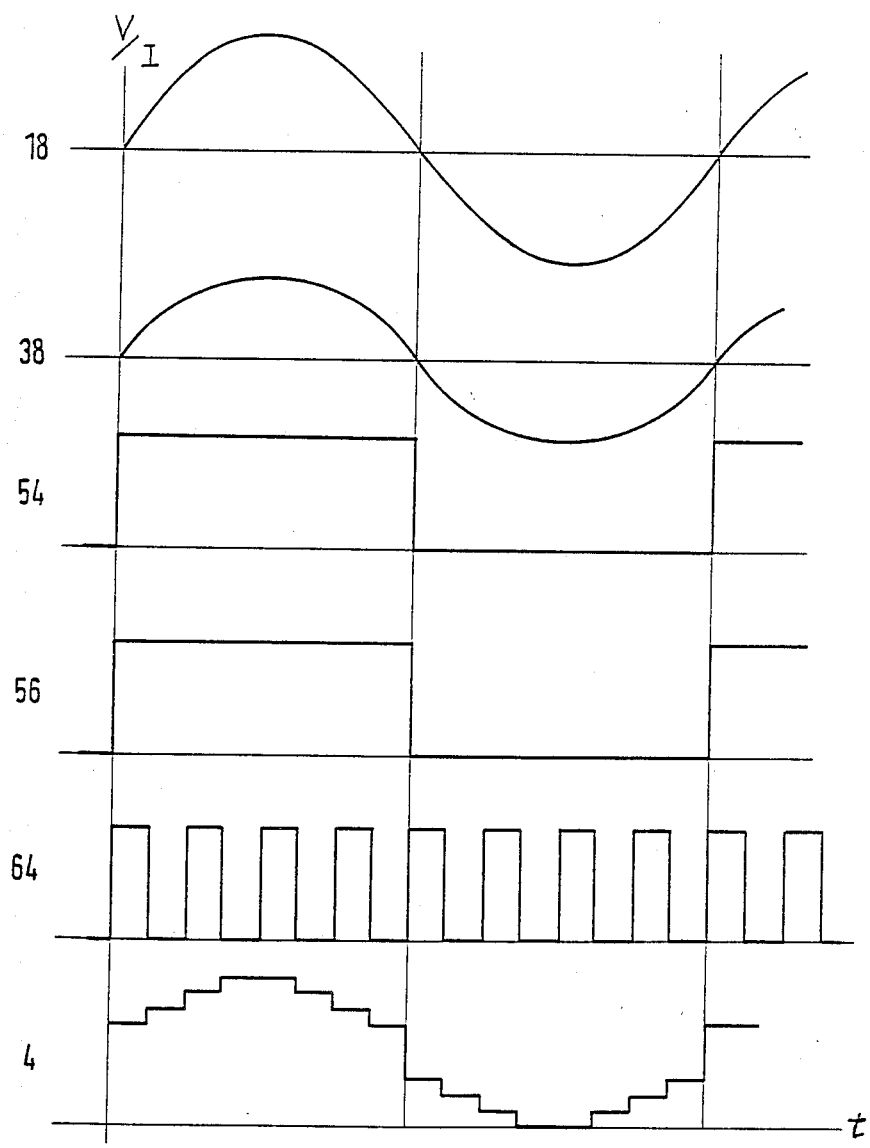
FIG. 2 is a timing diagram of electrical signals developed within the spray-coating device of FIG. 1.

Various voltage multiplier circuit embodiments are known in the art and accordingly the voltage multiplier circuit 28 of the present invention may be modeled, for example, after the voltage multipliers that are depicted in FIGS. 1 and 2 of U.S. Pat. No. 3,895,262.

A feedback circuit for detecting the electrical waveforms at the primary winding 22 in order to control the frequency of the sine-wave output 4 of analog switch arrangement 2 includes comparators 34 and 42, phase locked loop (PLL) circuit 60, counter 66, and a logic circuit 72. More specifically, the input voltage signal at terminal 20 of transformer 24 (taken from output 18 of bandpass filter 8) is connected to the negative input 32 of a first comparator 34 via a line 30. The other terminal 36 of primary winding 22 is connected, via a second output line 38, both to the negative input 40 of a second comparator 42 and to a reference potential 46, for example, ground, via a resistor 44. The remaining terminals of the various circuits of the invention, for example the positive inputs to comparators 34 and 42 etc., are connected in common to the reference potential 46.

The outputs 50 and 52 of comparators 34 and 42 are connected, via lines 54 and 56, to the phase locked loop (PLL) circuit 60 whose own output 62 is connected in turn to a counter 66, by means of line 64. Outputs 68 of counter 66 are supplied to a logic circuit 72, via line 70, and the loop is closed with the connection of the outputs 74 of logic circuit 72 to the analog switch arrangement 2 by means of lines 76. The number of outputs 74 of logic circuit 72 equals the number of input lines 76 of analog switch arrangement 2. By way of example, the three lines 76 in FIG. 1 define eight different logic states to enable the analog switch arrangement 2 to sequentially select different ones of the input lines 91-97 to thus construct the staircase-shaped output at terminal 4 of switch arrangement 2. If desired, more resistors may be provided in the voltage divider network 81-87 and a larger number of inputs lines 74 may be provided to obtain finer resolution of the staircase voltage at output line 4.

In operation, the numbered outputs of the circuit of FIG. 1 produce the similarly numbered outputs in FIG. 2 as the states of the input lines 76 are switched rapidly and sequentially in a manner that allows the analog switch arrangement 2 to produce the staircase-shaped output 4.

The feedback circuit of the present invention maintain the voltage and current waveforms 18 and 38 (FIG. 2) in phase with one another, assuring that the transformer 24 is operated at its resonant frequency. To this end, comparator 34 receives and digitizes the voltage waveform 18 and, in similar manner, the comparator 42 receives and digitizes the current waveform 38. The outputs of the comparators 34 and 42 are then supplied to the PLL circuit 60 which circuit responds, in a manner understood by those skilled in the art, by producing at its output 62 a rectangular waveshape (FIG. 2) whose frequency is constantly readjusted by the PLL circuit 60 in response to the outputs of the comparators 34 and 42. Upon coupling the output of PLL circuit to analog switch arrangement 2, the frequency of the output signal at output 18 of filter 8 varies in a direction that maintains the digital signals 54 and 56 in phase with one another.

The counter 66 and logic circuit 72 respond to the output 62 or PLL circuit 60 by producing at lines 74 of logic circuit 72 control signals for analog switch arrangement 2 which enable the switch arrangement 2 to rapidly and sequentially select the inputs from lines 91–97 in a manner that produces the stair-case-shaped sinusoidal voltage at output terminal 4 of switch arrangement 2. The frequency of the signal at terminal 4 is so controlled by the PLL circuit 60 and the counter 66 and logic circuit 72 as to assure that the voltage and current waveforms at terminals 18 and 38 are in phase with one another.

The staircase-shaped sinusoidal voltage output 4 is then filtered in the bandpass filter 8 and amplified by means of the power operational amplifier 10 to produce a smooth sinusoidal voltage which drives the transformer 24, the voltage multiplier 28 and ultimately the electrode 31 in spraying device 33.

While in the embodiment of FIG. 1, the potentiometer 90 enables the amplitude of the voltage at terminal 4 to be adjusted, it is possible to dispense with the potentiometer 90 and to provide a source of voltage 99 having a variable magnitude output. In this case the source of voltage 99 may be connected directly to the beginning of the chain of resistors 81–87 and the magnitude at output 4 may be directly adjusted at the source of voltage 99.

As described above, the counter 66, logic circuit 72, analog switch arrangement 2 and bandpass filter 8 cooperate to form a controllable sine-wave generator having an output at terminal 17 of bandpass filter 8. This controllable sine-wave generator receives a first analog input having an adjustable magnitude through input line 100 and a frequency signal input through its input line 76 which together allow both the amplitude and frequency of the sine-wave output at terminal 17 to be precisely adjusted to the resonant frequency of the transformer 24.

Although the present invention has been described in relation to particular embodiments thereof, many other variations and modifications and other uses will become apparent to those skilled in the art. It is preferred, therefore, that the present invention be limited not by the specific disclosure herein, but only by the appended claims

What is claimed is:

1. A spray-coating device, comprising:
   at least one electrode for electrostatic charging of coating material;
   a transformer for producing an output coupled to the at least one electrode, the transformer having voltage and current waveforms associated therewith;
   a voltage multiplier disposed between the transformer and the at least one electrode;
   means for producing an alternating voltage for driving the transformer, the alternating voltage producing means including feedback means for detecting the phases of the voltage and current waveforms of the transformer and controlling the alternating voltage such that the voltage and current waveforms are in phase with one another;
   the feedback means comprising a phase locked loop for producing an alternating voltage output of a frequency related to the phases of the voltage and current waveform and further comprising comparator means for sensing the voltage and the current waveforms of the transformer and for producing outputs for driving the phase locked loop, the comparator means including first and second comparators for sensing, respectively, the voltage and current waveforms; and
   an analog switch arrangement having an analog output, input means for receiving a plurality of voltage levels, and selecting means, coupled to the phase locked loop and to the plurality of voltage levels for outputting an alternating, staircase, shaped, voltage at the analog output of the analog switch arrangement.

2. The spray-coating device of claim 1, wherein the selecting means comprises means for sequentially selecting different ones of the plurality of voltage levels for outputting at the analog output of the analog switch arrangement.

3. The spray-coating device of claim 2, wherein the input means for receiving a plurality of voltage level includes a voltage divider network.

4. The spray-coating device of claim 3, further comprising an analog voltage source coupled to an input of the voltage divider network.

5. The spray-coating device of claim 4, further comprising a potentiometer disposed between the voltage source and the voltage divider network.

6. The spray-coating device of claim 1, wherein the feedback means includes a counter driven by the phase locked loop and a logic circuit disposed between the counter and the analog switch arrangement for producing selecting signals effective for sequentially selecting from the plurality of voltage levels for being outputted at the analog output of the analog switch arrangement.

7. The spray-coating device of claim 1, the alternating voltage producing means comprising an analog switch arrangement and a bandpass filter disposed between the analog switch arrangement and the transformer.

8. The spray-coating device of claim 7, wherein the bandpass filter includes an operational amplifier for amplifying an output received from the analog switch arrangement.

9. A spray-coating device, comprising:
   a controllable source of alternating voltage;
   a transformer having a primary winding connected to the controllable source of alternating voltage, a secondary winding and a voltage and a current associated with the primary winding;
   a voltage multiplier connected to the secondary winding of the transformer for producing a high DC voltage;
   at least one electrode driven by the high DC voltage for electrostatic charging of coating material; and
   the controllable source of alternating voltage including a controllable sign-wave generator having an output for outputting a sinusoidal voltage, an analog input for providing an analog signal input whose magnitude determines the amplitude of the sinusoidal voltage at the output, a frequency signal input for determining the frequency of the sinusoidal voltage and a feedback circuit coupled between the output of the controllable sine-wave generator and the frequency signal input, the feedback circuit being effective to regulate the frequency of the output signal such that the voltage and current of the transformer are in phase with one another.

10. The spray-coating device of claim 9, wherein the feedback circuit includes a first comparator for producing a digital signal related to the voltage at the transformer, a second comparator for producing a digital signal related to the current at the transformer, a phase locked loop circuit responsive to the first and second comparators for producing a rectangularly shaped output signal having a frequency which is adjusted by the phase locked loop circuit to maintain the voltage and current in phase with one another.

11. The spray-coating device of claim 10, further comprising a counter and a logic circuit disposed between the phase locked loop circuit and the sine-wave generator, the controllable sine-wave generator further including an analog switch arrangement coupled to and driven by the logic circuit to produce a staircase-shaped sinusoidal voltage the frequency of which is proportional to the frequency of the rectangularly shaped output signal of the phase locked loop circuit.

12. The spray-coating device of claim 11, further comprising a bandpass filter including a power operational amplifier coupled to the output of the analog switch arrangement and effective for filtering and amplifying the staircase-shaped sinusoidal voltage of the analog switch arrangement to obtain a clean and smooth sinusoidal voltage for driving the transformer.

13. The spray-coating device of claim 12, further including a source of analog voltage and a potentiometer disposed between the source of analog voltage and the analog switch arrangement for enabling adjusting of the amplitude of the sinusoidal voltage at the output of the analog switch arrangement.

* * * * *